June 10, 1941.  A. G. F. WALLGREN  2,244,930
LOCKING DEVICE
Filed July 15, 1937
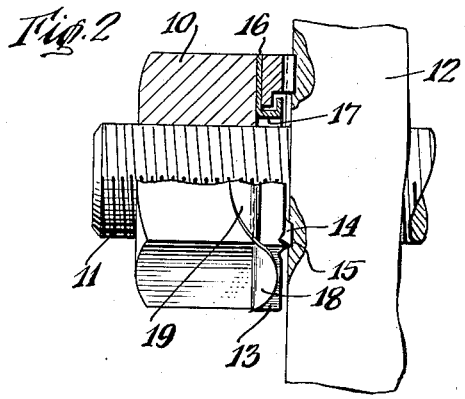
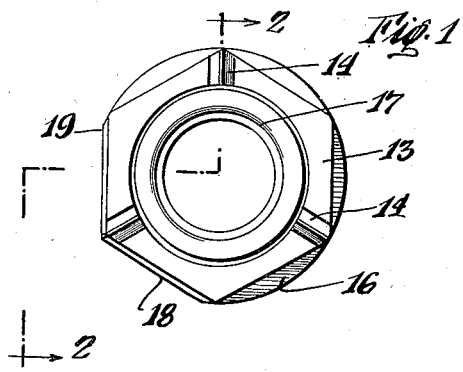
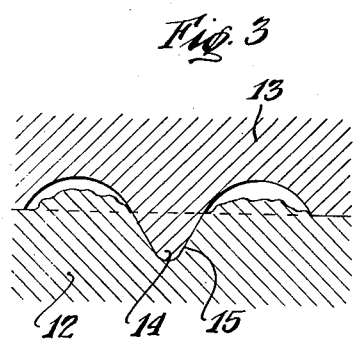
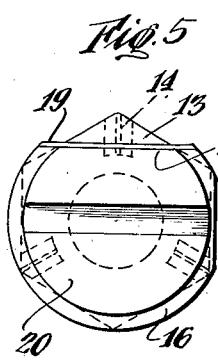
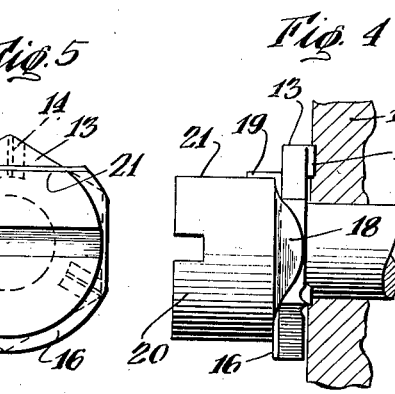
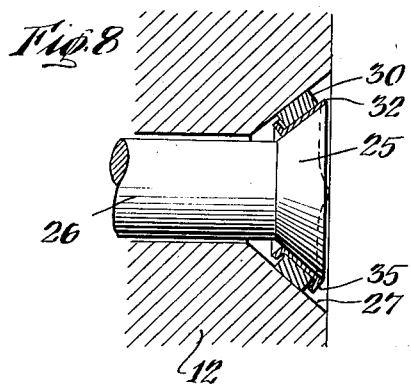
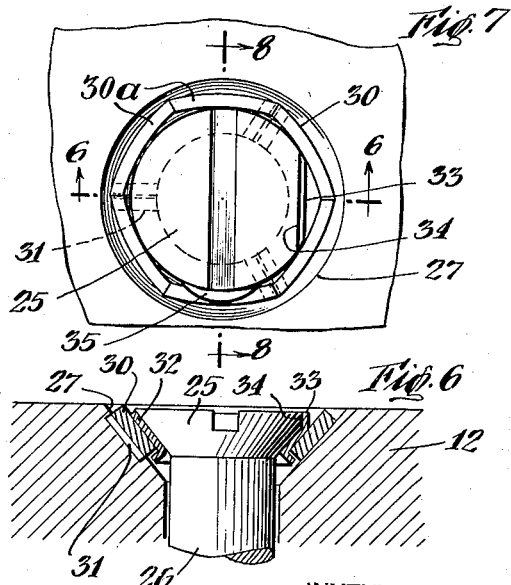
INVENTOR
August Gunnar Ferdinand Wallgren
BY
ATTORNEY Patented June 10, 1941

2,244,930

UNITED STATES PATENT OFFICE 2,244,930

LOCKING DEVICE

August Gunnar Ferdinand Wallgren, Stockholm, Sweden, assignor to Liljeqvist Sågblads-Och Redskapsfabrik Nya A. B., Eskilstuna, Sweden, a corporation of Sweden Application July 15, 1937, Serial No. 153,719
In Sweden July 17, 1936

7 Claims. (Cl. 151—35)

My invention relates to locking devices and more particularly to devices for locking nuts and/or bolts in such a manner as to positively prevent relative rotation taking place between the nut or bolt and the member which is bolted thereby. Another object of my invention is the provision of such a device as a unitary structure. Further objects and advantages of my invention will be apparent from the following description considered in connection with the accompanying drawing, which forms a part of this specification and of which:

Fig. 1 is an end view of a device embodying my invention;

Fig. 2 is a side view, partially in cross-section on the lines 2—2 of Fig. 1;

Fig. 3 is an enlarged view of a portion of the device shown in Figs. 1 and 2;

Fig. 4 is a side view of another embodiment of my invention;

Fig. 5 is an end view of the device shown in Fig. 4;

Fig. 6 is a cross-sectional view of a third embodiment of my invention and is taken on the line 6—6 of Fig. 7;

Fig. 7 is a top view of the device shown in Fig. 6; and

Fig. 8 is a cross-sectional view taken on the line 8—8 of Fig. 7.

Referring more particularly to Figs. 1 through 3, reference character 10 designates a nut adapted to be threaded on a bolt 11 which passes through a member 12. Disposed between nut 10 and member 12 is a locking element 13 which constitutes an annular ring provided with one or more ridge-like projections 14. Preferably, there are a plurality of projections which extend in a radial direction and are distributed equidistantly around the circumference of the element. The projections are made of comparatively hard material and, for instance, may be case-hardened. Recesses 15 are formed on either side of projections 14. The outer surface of element 13 is formed with flat surfaces and may be hexagonal.

Disposed between nut 10 and element 13 is a locking washer 16, the inner edge of which is formed as a circular channel 17 extending around the inner edge of element 13. Thus, element 13 and washer 16 are rotatably connected to each other. If desired, washer 16 may be rigidly secured to nut 10, as by spot-welding, although this is not necessary. The advantage of connecting the washer and nut together is that there results a unitary structure consisting of the nut, the washer and the locking element 13.

When the nut 10 is rotated relative to the bolt 11 in the proper direction, it advances toward the member 12 and the projections 14, being of hard material, penetrate the surface of the member 12 as is shown particularly in Fig. 3. The recesses 15 on either side of projections 14 receive the material of member 12 which is displaced because of the penetration. The result is that relative rotation between the element 13 and the member 12 is positively prevented. After the nut has been tightened sufficiently, certain portions 18 of the outer edge of washer 16 are bent over so as to engage the flat surfaces of element 13, thus preventing relative rotation between the element and the washer. If the washer is rigidly secured to the nut 10, the nut is hence locked against rotation with respect to both the locking element 13 and the member 12. If the washer and nut are not secured together, other portions 19 of the washer may be bent so as to engage the flat surfaces of the nut, thus preventing relative rotation between the nut and the washer.

In the arrangement shown in Figs. 4 and 5, the locking is between a round-headed screw 20 and the member 12 through which the screw extends. The construction of the locking element 13 and washer 16 is the same as that described in connection with the first embodiment. The head of screw 20 is formed with a flat surface 21 with which may be engaged the bent-over portion 19 of the washer.

When the screw is tightened, the projections 14 penetrate the surface of the member 12, thus locking element 13 against rotation with respect to member 12. Thereafter, the washer 16 is bent so as to engage the flat surfaces formed on element 13 and on screw 20, whereupon rotation between the screw and member 12 is positively prevented.

In the embodiment shown in Figs. 6 through 8, the locking is effected between the conical head 25 of a countersunk screw 26 and the conical surface 27 of the recess in the member 12 which receives the head 25. In this embodiment there is provided a conical locking element 30, the lateral face 30a of which is made hexagonal. This element is provided with a plurality of hardened projections 31 which are adapted to penetrate into the conical surface 27 formed in member 12. Disposed between locking element 30 and the head 25 is a generally conical washer 32. After the bolt has been tightened and the projections 31 have penetrated into member 12, a portion 33 of washer 32 is bent so as to engage a flattened surface 34 formed on the head 25 of the screw, while another portion 35 of the washer is bent so as to engage one of the flattened surfaces 30a formed on the conical locking element 30. Thus, the bolt 26 is positively locked against rotation with respect to member 12.

While I have described several more or less specific embodiments of my invention, it is to be understood that this has been done for purposes of illustration only and that further modifications fall within its scope, which is to be limited only by the appended claims.

What I claim is:

1. In a device for locking two members against relative rotation, a locking element adapted to be disposed between said members and being formed with a projection for engaging one of the members to thereby prevent relative rotation between said element and said one of said members, a lock washer adapted to be disposed between said element and the other of said members, said washer being rotatably and permanently connected to said element and being deformable to prevent rotation relative to said element, and means for preventing relative rotation between said washer and the other of said members.

2. In a device for locking two members against relative rotation, a locking element adapted to be disposed between said members and being formed with a projection for engaging one of the members to thereby prevent relative rotation between said element and said one of said members, and a lock washer adapted to be disposed between said element and the other of said members, said washer having a flange cooperating with a circular edge of said element for rotatably connecting the washer and element together, said washer being deformable to prevent rotation relative to said element and relative to the other of said elements 3. In a device for locking two members against relative rotation, a locking element adapted to be disposed between said members and being formed with a projection for engaging one of the members to thereby prevent relative rotation between said element and said one of said members, and a lock washer rigidly secured to the other of said members and rotatably connected to said element, said washer being deformable into engagement with said element to prevent rotation of the washer relative to said element.

4. In a device for locking two members against relative rotation, a locking element adapted to be disposed between said members and being formed with a projection for engaging one of the members to thereby prevent relative rotation between said element and said one of said members, and a lock washer adapted to be disposed between said element and the other of said members and having a flange cooperating with a circular edge of said element for rotatably connecting the washer and element together, said element and the other of said members being formed with flattened surfaces and said washer being deformable to engage said surfaces to prevent relative rotation between the element and the washer and between the washer and said other member.

5. In a device for locking a generally round headed screw against relative rotation with respect to a member, a locking element adapted to be disposed between said member and the head of said screw and being formed with a projection for engaging said member, said round head being formed with a flattened portion and said locking element being formed with a flat surface, and a washer between said head and said element, said washer being rotatably and permanently secured to said element and being deformable to engage said flattened portion and said flat surface.

6. In a device for locking a conically headed screw against rotation with respect to a member formed with a conical recess for receiving said head, a conical locking element disposed between the head and the surface of the recess and formed with a projection adapted to penetrate said surface, and a conical locking washer between said head and said element, said washer being rotatably and permanently secured to said element and being deformable to engage flattened surfaces on said head and said element.

7. In a device for locking two members against relative rotation, a locking element adapted to be disposed between said members and being formed with a plurality of equi-distantly spaced projections for engaging one of the members, and means rotatably and permanently connected to said element and deformable to lock said element and the other of said members against relative rotation.

AUGUST GUNNAR FERDINAND WALLGREN.